(12) United States Patent
Bert

(10) Patent No.: US 11,137,920 B1
(45) Date of Patent: Oct. 5, 2021

(54) STORING ZONES IN A ZONE NAMESPACE ON SEPARATE PLANES OF A MULTI-PLANE MEMORY DEVICE

(71) Applicant: Micron Technology, Inc., Boise, ID (US)

(72) Inventor: Luca Bert, San Jose, CA (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 15/929,398

(22) Filed: Apr. 30, 2020

(51) Int. Cl.
*G06F 3/06* (2006.01)

(52) U.S. Cl.
CPC .......... *G06F 3/0632* (2013.01); *G06F 3/0604* (2013.01); *G06F 3/0644* (2013.01); *G06F 3/0659* (2013.01); *G06F 3/0673* (2013.01)

(58) Field of Classification Search
CPC .... G06F 3/0632; G06F 3/0604; G06F 3/0644; G06F 3/0659; G06F 3/0673
See application file for complete search history.

(56) References Cited

U.S. PATENT DOCUMENTS

| 9,710,377 | B1* | 7/2017 | Kuzmin | G06F 11/1068 |
| 2019/0385694 | A1* | 12/2019 | Chen | H03M 13/1108 |
| 2020/0089407 | A1* | 3/2020 | Baca | G06F 3/064 |
| 2020/0167274 | A1* | 5/2020 | Bahirat | G06F 3/0659 |
| 2020/0356306 | A1* | 11/2020 | Subbarao | G06F 12/10 |

* cited by examiner

*Primary Examiner* — Tammara R Peyton
(74) *Attorney, Agent, or Firm* — Lowenstein Sandler LLP

(57) ABSTRACT

A processing device in a memory system receives requests to perform a plurality of memory access operations at a memory device configured with a zone namespace having a plurality of zones. The memory device includes a plurality of planes, wherein each zone of the plurality of zones is associated with a separate plane of the plurality of planes. The processing device further concurrently performs a first memory access operation of the plurality of memory access operations on first data stored in a first zone of the plurality of zones and a second memory access operation of the plurality of memory access operations on second data stored in a second zone of the plurality of zones, wherein the first zone is associated with a first plane of the plurality of planes, and wherein the second zone is associated with a second plane of the plurality of planes.

20 Claims, 5 Drawing Sheets

US 11,137,920 B1

STORING ZONES IN A ZONE NAMESPACE ON SEPARATE PLANES OF A MULTI-PLANE MEMORY DEVICE

TECHNICAL FIELD

Embodiments of the disclosure relate generally to memory sub-systems, and more specifically, relate to storing zones in a zone namespace on separate planes of a multi-plane memory device in a memory sub-system.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The present disclosure will be understood more fully from the detailed description given below and from the accompanying drawings of various embodiments of the disclosure.

DETAILED DESCRIPTION

Figure 1:
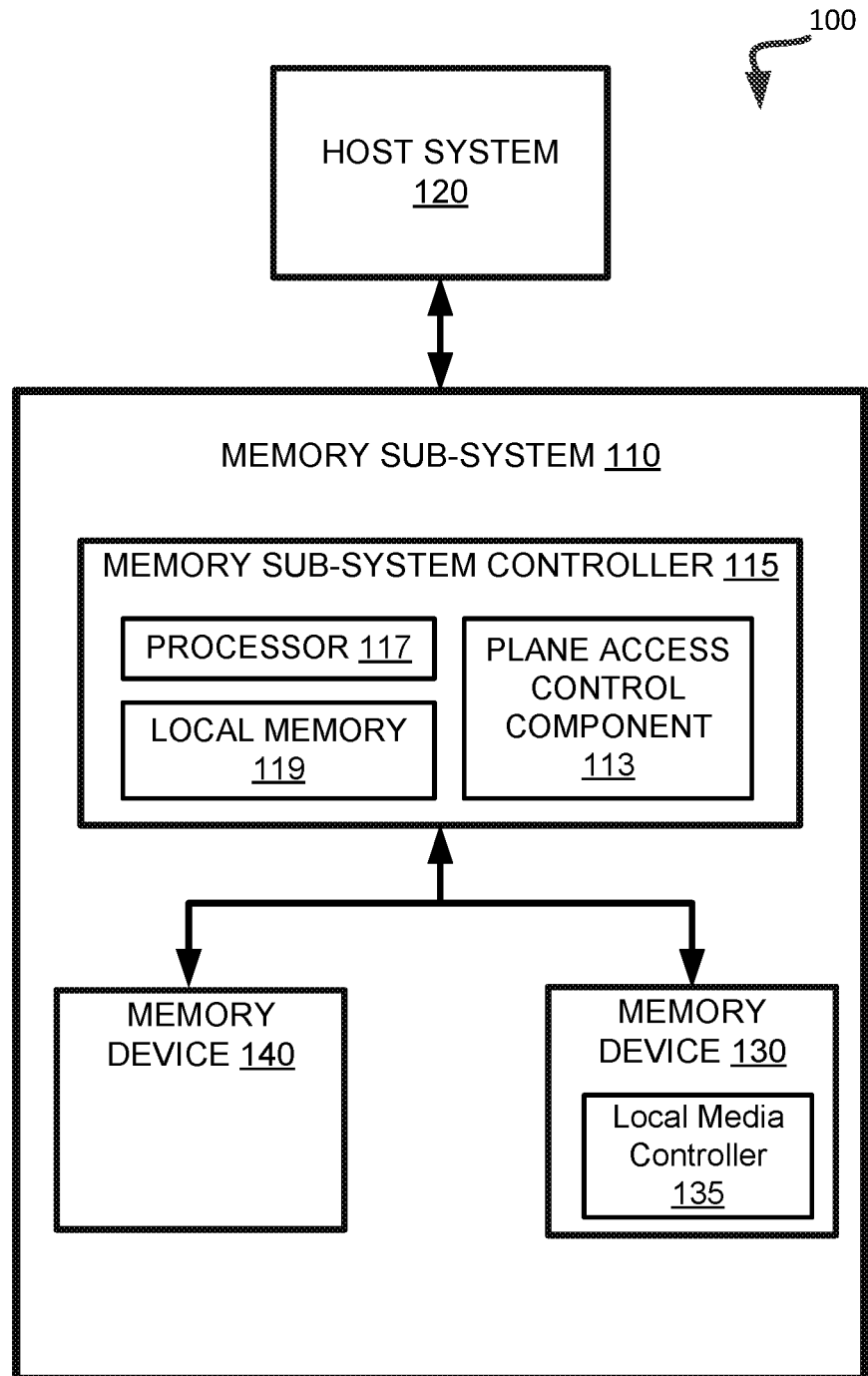
FIG. 1 illustrates an example computing system that includes a memory sub-system in accordance with some embodiments of the present disclosure.

Aspects of the present disclosure are directed to storing zones in a zone namespace on separate planes of a multi-plane memory device in a memory sub-system. A memory sub-system can be a storage device, a memory module, or a hybrid of a storage device and memory module. Examples of storage devices and memory modules are described below in conjunction with FIG. 1. In general, a host system can utilize a memory sub-system that includes one or more components, such as memory devices that store data. The host system can provide data to be stored at the memory sub-system and can request data to be retrieved from the memory sub-system.

A memory sub-system can include high density non-volatile memory devices where retention of data is desired when no power is supplied to the memory device. One example of non-volatile memory devices is a negative- and (NAND) memory device. Other examples of non-volatile memory devices are described below in conjunction with FIG. 1. A non-volatile memory device is a package of one or more dies. Each die can consist of one or more planes. For some types of non-volatile memory devices (e.g., NAND devices), each plane consists of a set of physical blocks. Each block consists of a set of pages. Each page consists of a set of memory cells ("cells"). A cell is an electronic circuit that stores information. Depending on the cell type, a cell can store one or more bits of binary information, and has various logic states that correlate to the number of bits being stored. The logic states can be represented by binary values, such as "0" and "1", or combinations of such values.

A memory device can be made up of bits arranged in a two-dimensional grid. Memory cells are etched onto a silicon wafer in an array of columns (also hereinafter referred to as bitlines) and rows (also hereinafter referred to as wordlines). A wordline can refer to one or more rows of memory cells of a memory device that are used with one or more bitlines to generate the address of each of the memory cells. The intersection of a bitline and wordline constitutes the address of the memory cell. A block hereinafter refers to a unit of the memory device used to store data and can include a group of memory cells, a wordline group, a wordline, or individual memory cells. One or more blocks can be grouped together to form a plane of the memory device in order to allow concurrent operations to take place on each plane. The memory device can include circuitry that performs concurrent memory page accesses of two or more memory planes. For example, the memory device can include a respective access line driver circuit and power circuit for each plane of the memory device to facilitate concurrent access of pages of two or more memory planes, including different page types.

Certain memory devices are also configured with a zone namespace. In a zone namespace, the address space of the memory device is divided into zones which allows for more efficient management of data as the capacity of the memory device increases. For example, each individual zone can be designated for use by a specific client application executed by the host system or some other system with access to the memory device. In a conventional data layout orientation, the zones of the zone namespace are stored in a stripe of blocks arranged across the planes of the memory device. Since, in a zone namespace, writes are performed sequentially starting from the beginning of each zone and at a larger granularity (e.g., 64 kilobytes), any time data is written to a certain zone, all of the planes of the memory device, or at least multiple planes, will be inaccessible for the duration of the write operation. Accordingly, if a read request for data stored in the same zone or a different zone is received while the write operation is ongoing, even if directed to data in a block of a different plane of the memory device, the memory sub-system will have to suspend the write operation in order to perform the read. Since writes tend to be large in size (e.g., 64 kilobytes up to 0.5 Megabytes or more), there can be potentially many read operations received while the write operation is ongoing, requiring the write operation to be suspended many times. This can negatively impact performance in the memory sub-system leading to increased latency and decreased quality of service.

Aspects of the present disclosure address the above and other deficiencies by storing zones in a zone namespace on separate planes of a multi-plane memory device in a memory sub-system. In one embodiment, the memory sub-system changes the data layout orientation, so that the zones of the zone namespace are each stored in blocks of separate planes of the memory device. For example, the memory sub-system can configure a memory device, such as a non-volatile memory device, with a zone namespace having multiple zones. The memory sub-system can further associate a first zone with a first plane of the memory device and associate a second zone with a second plane of the memory device. The memory sub-system can proceed in similar fashion such that each zone is associated with only one plane of the memory device, however, in some cases, there can be multiple zones associated with one plane. Accordingly, the blocks of data of any one zone are all stored on the same plane of the memory device. When the memory sub-system receives requests to perform memory access operations at the memory device configured with the zone namespace, the memory sub-system can concurrently perform multiple memory access operations on data stored in separate zones. For example, the memory sub-system can perform a first memory access operation on first data stored in a first zone associated with a first plane and a second memory access operation on second data stored in a second zone associated with a second plane at the same time. Thus, when a program operation is being performed on the blocks of one zone, only a single plane is inaccessible. Memory access operations can be performed on zones stored on the remaining planes of the memory device concurrently, without the need to suspend the program operation.

Reconfiguring the data layout orientation, so that the zones of the zone namespace are each stored on separate planes of the memory device results in significant performance improvements in the memory sub-system. The quality of service levels that can be provided to clients of the host system are increased as the likelihood of collisions between memory access operations directed to the same plane of the memory device is substantially decreased. Furthermore, the techniques described herein allow for increased scalability of the size and number of memory die in a memory sub-system while maintaining, and possibly improving, the associated performance characteristics, such as request latency and throughput.

FIG. 1 illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) and a hard disk drive (HDD). Examples of memory modules include a dual in-line memory module (DIMM), a small outline DIMM (SO-DIMM), and various types of non-volatile dual in-line memory module (NVDIMM).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to different types of memory sub-system 110. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), a double data rate (DDR) memory bus, Small Computer System Interface (SCSI), a dual in-line memory module (DIMM) interface (e.g., DIMM socket interface that supports Double Data Rate (DDR)), etc. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the physical host interface (e.g., PCIe bus). The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130,140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include negative- and (NAND) type flash memory and write-in-place memory, such as a three-dimensional cross-point ("3D cross-point") memory device, which is a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLCs) can store multiple bits per cell. In some embodiments, each of the memory devices 130 can include one or more arrays of memory cells such as SLCs, MLCs, TLCs, QLCs, or any combination of such. In some embodiments, a particular memory device can include an SLC portion, and an MLC portion, a TLC portion, a QLC portion, or a PLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as 3D cross-point array of non-volatile memory cells and NAND type flash memory (e.g., 2D NAND, 3D NAND) are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative- or (NOR) flash memory, and electrically erasable programmable read-only memory (EEPROM).

A memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can be a processing device, which includes one or more processors (e.g., processor 117), configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130. The memory sub-system controller 115 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address) that are associated with the memory devices 130. The memory sub-system controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, a memory device 130 is a managed memory device, which is a raw memory device combined with a local controller (e.g., local controller 135) for media management within the same memory device package. An example of a managed memory device is a managed NAND (MNAND) device.

In one embodiment, the memory sub-system 110 includes a plane access control component 113 that coordinates the storing of zones in a zone namespace on separate planes of a multi-plane memory device, such as memory device 130, in memory sub-system 110. In one embodiment, plane access control component 113 can configure memory device 130 with a zone namespace having multiple zones, and can further associate a first zone with a first plane of memory device 130 and associate a second zone with a second plane of memory device 130. Plane access control component 113 can do the same for any additional zones, such that each zone is associated with only one plane of memory device 130. In some cases, there can be multiple zones associated with one plane. When the memory sub-system receives requests to perform memory access operations at memory device 130, such as program operations or read operations, plane access control component 113 can concurrently perform multiple memory access operations on data stored in separate zones. For example, plane access control component 113 can perform a first memory access operation, such as a program operation, on first data stored in a first zone associated with a first plane of memory device 130 and a second memory access operation, such as a read operation, on second data stored in a second zone associated with a second plane of memory device 130. In one embodiment, plane access control component 113 can perform the first and second memory access operations concurrently (i.e., such that the operations at least partially overlap in time). Further details with regards to the operations of plane access control component 113 are described below.

In some embodiments, the memory sub-system controller 115 includes at least a portion of plane access control component 113. For example, the memory sub-system controller 115 can include a processor 117 (e.g., a processing device) configured to execute instructions stored in local memory 119 for performing the operations described herein. In some embodiments, plane access control component 113 is part of the host system 110, an application, or an operating system. In other embodiment, local media controller 135 includes at least a portion of plane access control component 113 and is configured to perform the functionality described herein.

Figure 2:
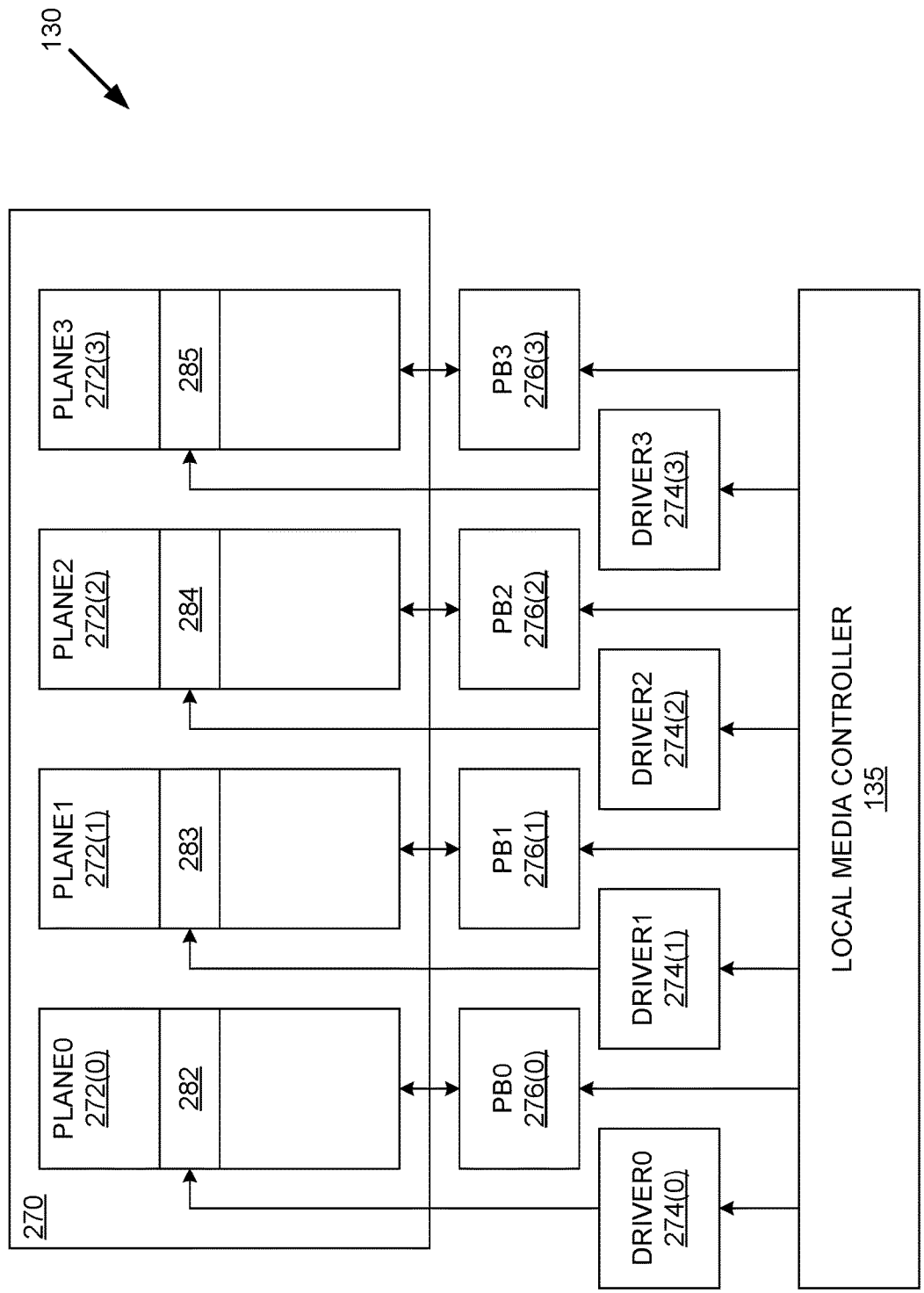
FIG. 2 is a block diagram illustrating a multi-plane memory device configured to store zones in a zone namespace memory on separate planes in accordance with some embodiments of the present disclosure.

FIG. 2 is a block diagram illustrating a multi-plane memory device 130 configured to store zones in a zone namespace memory on separate planes in accordance with some embodiments of the present disclosure. The memory device 130 includes a memory array 270 divided into memory planes 272(0)-272(3) that each includes a respective number of memory cells. The multi-plane memory device 130 can further include local media controller 135, including a power control circuit and access control circuit for concurrently performing memory access operations for different memory planes 272(0)-272(3). The memory cells can be non-volatile memory cells, such as NAND flash cells, or can generally be any type of memory cells.

The memory planes 272(0)-272(3) can each be divided into blocks of data, with a different relative block of data from each of the memory planes 272(0)-272(3) concurrently accessible during memory access operations. For example, during memory access operations, data block 282 of the memory plane 272(0), data block 283 of the memory plane 272(1), data block 284 of the memory plane 272(2), and data block 285 of the memory plane 272(3) can each be accessed concurrently.

Each of the memory planes 272(0)-272(3) can be coupled to a respective page buffer 276(0)-276(3). Each page buffer 276(0)-276(3) can be configured to provide data to or receive data from the respective memory plane 272(0)-272(3). The page buffers 276(0)-276(3) can be controlled by local media controller 135. Data received from the respective memory plane 272(0)-272(3) can be latched at the page buffers 276(0)-276(3), respectively, and retrieved by local media controller 135, and provided to the memory sub-system controller 115 via the NVMe interface.

Each of the memory planes 272(0)-272(3) can be further coupled to a respective access driver circuit 274(0)-274(3), such as an access line driver circuit. The driver circuits 274(0)-274(3) can be configured to condition a page of a respective block of an associated memory plane 272(0)-272(3) for a memory access operation, such as programming data (i.e., writing data), reading data, or erasing data. Each of the driver circuits 274(0)-274(3) can be coupled to a respective global access lines associated with a respective memory plane 272(0)-272(3). Each of the global access lines can be selectively coupled to respective local access lines within a block of a plane during a memory access operation associated with a page within the block. The driver circuits 274(0)-274(3) can be controlled based on signals from local media controller 135. Each of the driver circuits 274(0)-274(3) can include or be coupled to a respective power circuit, and can provide voltages to respective access lines based on voltages provided by the respective power circuit. The voltages provided by the power circuits can be based on signals received from local media controller 135.

The local media controller 135 can control the driver circuits 274(0)-274(3) and page buffers 276(0)-276(3) to concurrently perform memory access operations associated with each of a group of memory command and address pairs (e.g., received from memory sub-system controller 115). For example, local media controller 135 can control the driver circuits 274(0)-274(3) and page buffer 376(0)-376(3) to perform the concurrent memory access operations. Local media controller 135 can include a power control circuit that serially configures two or more of the driver circuits 274(0)-274(3) for the concurrent memory access operations, and an access control circuit configured to control two or more of the page buffers 276(0)-276(3) to sense and latch data from the respective memory planes 272(0)-272(3), or program data to the respective memory planes 272(0)-272(3) to perform the concurrent memory access operations.

In operation, local media controller 135 can receive a group of memory command and address pairs via the NVMe bus, with each pair arriving in parallel or serially. In some examples, the group of memory command and address pairs can each be associated with different respective memory planes 272(0)-272(3) of the memory array 270. The local media controller 135 can be configured to perform concurrent memory access operations (e.g., read operations or program operations) for the different memory planes 272(0)-272(3) of the memory array 370 responsive to the group of memory command and address pairs. For example, the power control circuit of local media controller 135 can serially configure, for the concurrent memory access operations based on respective page type (e.g., UP, MP, LP, XP, SLC/MLC/TLC/QLC page), the driver circuits 274(0)-274(3) for two or more memory planes 272(0)-272(3) associated with the group of memory command and address pairs. After the access line driver circuits 274(0)-274(3) have been configured, the access control circuit of local media controller 135 can concurrently control the page buffers 276(0)-276(3) to access the respective pages of each of the two or more memory planes 272(0)-272(3) associated with the group of memory command and address pairs, such as retrieving data or writing data, during the concurrent memory access operations. For example, the access control circuit can concurrently (e.g., in parallel and/or contemporaneously) control the page buffers 276(0)-276(3) to charge/discharge bitlines, sense data from the two or more memory planes 272(0)-272(3), and/or latch the data.

Based on the signals received from local media controller 135, the driver circuits 274(0)-274(3) that are coupled to the memory planes 272(0)-272(3) associated with the group of memory command and address command pairs can select blocks of memory or memory cells from the associated memory plane 272(0)-272(3), for memory operations, such as read, program, and/or erase operations. The driver circuits 274(0)-274(3) can drive different respective global access lines associated with a respective memory plane 272(0)-272(3). As an example, the driver circuit 274(0) can drive a first voltage on a first global access line associated with the memory plane 272(0), the driver circuit 274(1) can drive a second voltage on a third global access line associated with the memory plane 272(1), the driver circuit 274(2) can drive a third voltage on a seventh global access line associated with the memory plane 272(2), etc., and other voltages can be driven on each of the remaining global access lines. In some examples, pass voltages can be provided on all access lines except an access line associated with a page of a memory plane 272(0)-272(3) to be accessed. The local media controller 135, the driver circuits 274(0)-274(3) can allow different respective pages, and the page buffers 276(0)-276(3) within different respective blocks of memory cells, to be accessed concurrently. For example, a first page of a first block of a first memory plane can be accessed concurrently with a second page of a second block of a second memory plane, regardless of page type.

The page buffers 276(0)-276(3) can provide data to or receive data from the local media controller 135 during the memory access operations responsive to signals from the local media controller 135 and the respective memory planes 272(0)-272(3). The local media controller 135 can provide the received data to memory sub-system controller 115.

It will be appreciated that the memory device 130 can include more or less than four memory planes, driver circuits, and page buffers. It will also be appreciated that the respective global access lines can include 8, 16, 32, 64, 128, etc., global access lines. The local media controller 135 and the driver circuits 274(0)-274(3) can concurrently access different respective pages within different respective blocks of different memory planes when the different respective pages are of a different page type. For example, in an embodiment, where memory device 130 is configured with a zone namespace, and where each zone in the zone namespace is associated with a separate one of memory planes 272(0)-272(3), local media controller 135 can concurrently perform memory access operations on data stored in different zones. For example, the local media controller 135 can concurrently perform a first memory access operation on first data stored in a first zone associated with memory plane 272(0) and a second memory access operation on second data stored in a second zone 272(1).

Figure 3:
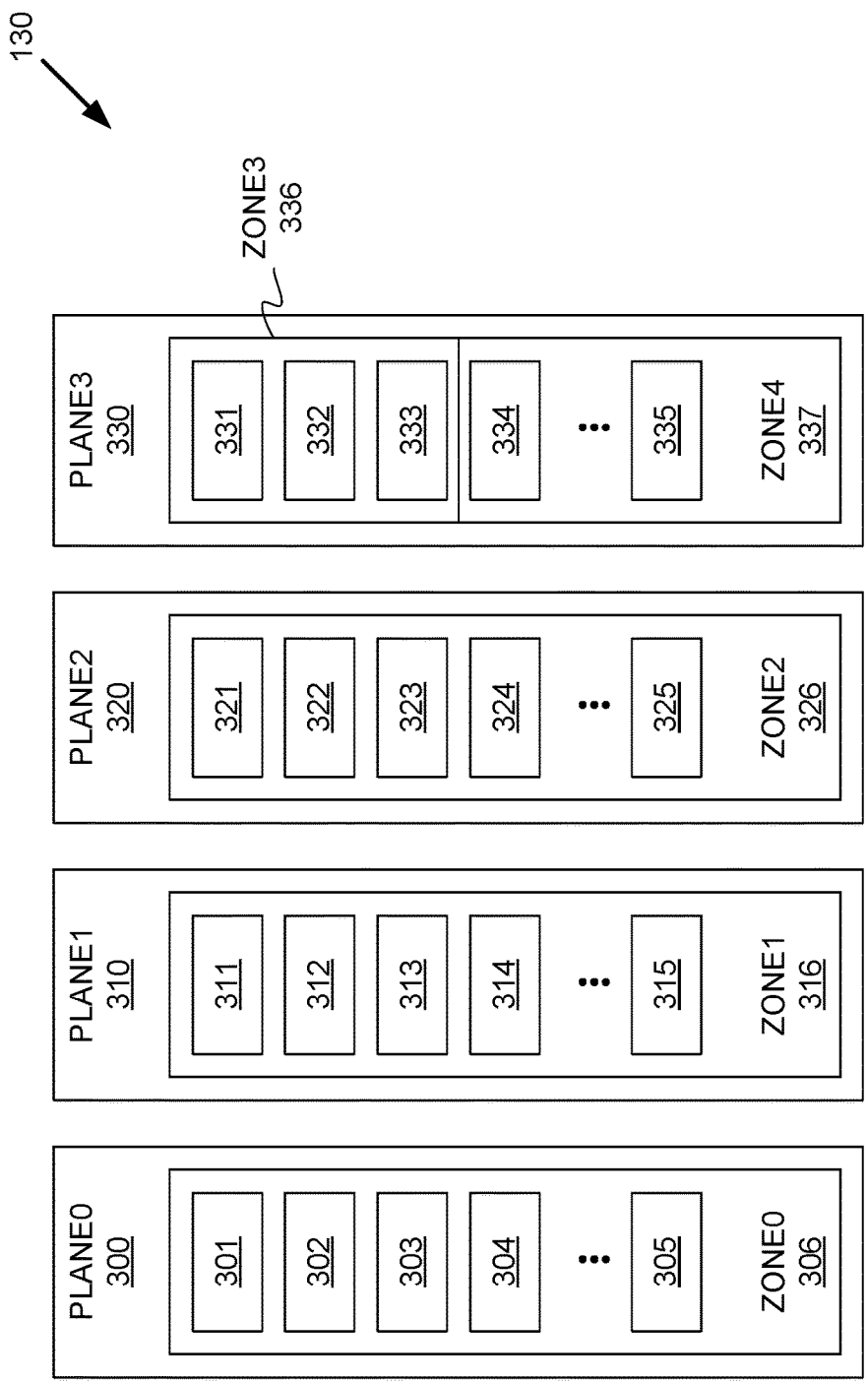
FIG. 3 is a block diagram illustrating a multi-plane memory device configured to store zones in a zone namespace memory on separate planes in accordance with some embodiments of the present disclosure.

FIG. 3 is a block diagram illustrating a multi-plane memory device 130 configured to store zones in a zone namespace memory on separate planes in accordance with some embodiments of the present disclosure. In one embodiment, memory device 130 includes an array of cells organized into multiple planes 300, 310, 320, and 330. Depending on the embodiment, there can be any number of planes, including more or fewer planes than are illustrated in FIG. 3. As described above, each of the planes can include associated circuitry to enable memory access operations to be performed on multiple planes concurrently. Each memory plane can also be divided into blocks of memory cell pages. For example, plane 300 includes blocks 301-305, plane 310 includes blocks 311-315, plane 320 includes blocks 321-325, and plane 330 includes blocks 331-335. Depending on the embodiment, each of the planes can include any number of blocks, including more or fewer blocks than are illustrated in FIG. 3, and each of the planes can include either the same number or a different number of blocks.

In one embodiment, memory device 130 is configured with a zone namespace. In a zone namespace, the address space of memory device 130 is divided into a number of separate zones 306, 316, 326, 336, and 337, which allows for more efficient management of data as the capacity of the memory device increases. Depending on the embodiment, there can be any number of zones, including more or fewer zones than are illustrated in FIG. 3. A zone namespace can have an optimal write size that can be larger (e.g., 64 KB, 128 KB) than non-zoned memory. In addition, with a zone namespace, writes are performed sequentially starting from the beginning of each zone and data within a zone typically cannot be arbitrarily overwritten. Instead, a zone write pointer is usually reset, effectively deleting the data in the zone and writing of data can be restarted from the beginning of the zone. In one embodiment, upon configuring memory device 130 with a zone namespace, plane access control component 113 can associate each of the zones with a separate one of planes 300, 310, 320, and 330. For example, plane access control component 113 can associate zone 306 with plane 300, zone 316 with zone 310, zone 326 with zone 320, and zone 336 with zone 330. Associating a zone with a plane can include storing all of the blocks of data corresponding to a certain zone on a single plane of memory device 130. In one embodiment, there can be multiple zones associated with a single plane. For example, zone 336 and zone 337 can both be associated with plane 330, such that all of the blocks of data corresponding to zones 336 and 337 are stored only on plane 330.

In one embodiment, when the memory sub-system receives requests to perform memory access operations at memory device 130, plane access control component 113 can concurrently perform multiple memory access operations on data stored in separate zones. For example, the memory sub-system can perform a first memory access operation on first data stored in zone 306 associated with plane 300 and a second memory access operation on second data stored in zone 316 associated with plane 310 at the same time. Thus, when a program operation is being performed on the blocks of one zone (e.g., zone 306), only a single plane (e.g., plane 300) is inaccessible. Memory access operations can be performed on other zones (e.g., zones 316, 326, 336, and 337) stored on the remaining planes (e.g., planes 310, 320, and 330) of memory device 130 concurrently, without the need to suspend the program operation.

Figure 4:
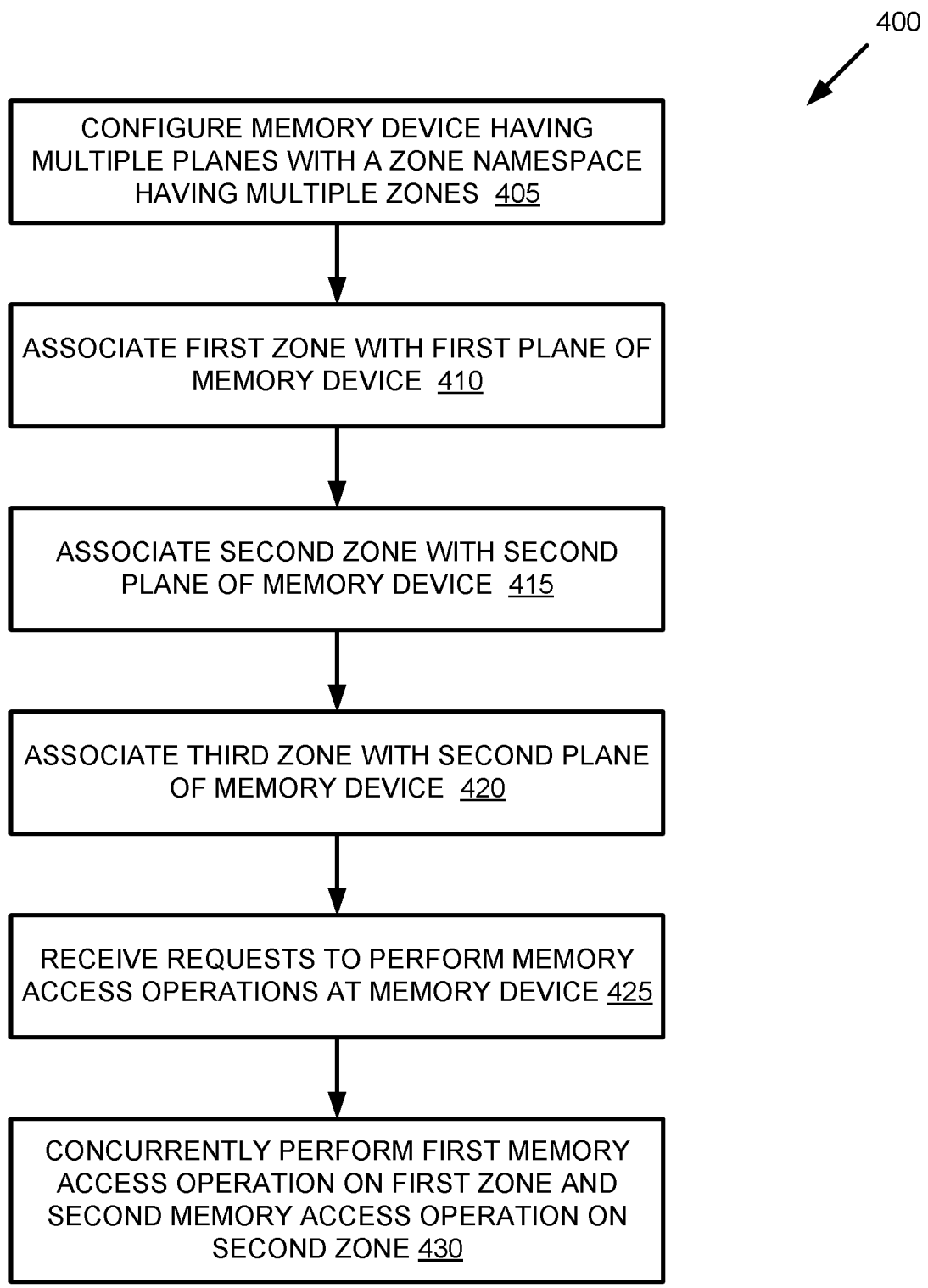
FIG. 4 is a flow diagram of an example method of storing zones in a zone namespace on separate planes of a multi-plane memory device in a memory sub-system in accordance with some embodiments of the present disclosure.

FIG. 4 is a flow diagram of an example method of storing zones in a zone namespace on separate planes of a multi-plane memory device in a memory sub-system in accordance with some embodiments of the present disclosure. The method 400 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 400 is performed by plane access control component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 405, the processing logic configures memory device 130 having multiple planes, such as planes 300, 310, 320, and 330, with a zone namespace having multiple zones, such as zones 306, 316, 326, 336, and 337. In one embodiment, each zone in the zone namespace accepts sequential write operations, such as from memory sub-system controller 115, or from host system 120. In one embodiment, each zone in the zone namespace is associated with a different client. For example, a first zone, such as zone 306, can be associated with a first client of the host system 120, and the second zone, such as zone 336, can be associated with a second client of the host system 120. A client can include, for example, an operating system, application, or other program executing on host system 120 or memory sub-system 110, or some other device communicably connected to host system 120 or otherwise having access to memory sub-system 110. In one embodiment, a client can include one or more devices, applications, etc. associated with a certain entity, such as an organization or individual user.

At operation 410, the processing logic associates a first zone, such as zone 306, of the multiple zones with a first plane, such as plane 300, of the multiple planes. In one embodiment, to associate the first zone with the first plane, plane access control component 113 stores blocks of data, such as blocks 301-305, corresponding to zone 306 on plane 300. Rather than having the blocks 301-305 arranged in a stripe across multiple planes, the data layout orientation is rearranged such that all of the blocks 301-305 corresponding to zone 306 are stored on plane 300.

At operation 415, the processing logic associates a second zone, such as zone 336, of the multiple zones with a second plane, such as plane 330, of the multiple planes. In one embodiment, to associate the second zone with the second plane, plane access control component 113 stores blocks of data, such as blocks 331-333, corresponding to zone 336 on plane 330. Rather than having the blocks 331-333 arranged in a stripe across multiple planes, the data layout orientation is rearranged such that all of the blocks 331-333 corresponding to zone 336 are stored on plane 330.

At operation 420, the processing logic associates a third zone, such as zone 337, of the multiple zones with the second plane, such as plane 330, of the multiple planes. In one embodiment, to associate the third zone with the second plane, plane access control component 113 stores blocks of data, such as blocks 334-335, corresponding to zone 337 on plane 330. Rather than having the blocks 334-335 arranged in a stripe across multiple planes, the data layout orientation is rearranged such that all of the blocks 334-335 corresponding to zone 337 are stored on plane 330.

At operation 425, the processing logic receives requests to perform memory access operations at memory device 130. In one embodiment, the requests can be received from host system 120 and can pertain to data store by host system 120 in memory sub-system 110. In one embodiment, the requests can be generated internally to memory sub-system 110, such as by memory sub-system controller 115, and can pertain to data management operations. Memory access operations can include, for example, program operations, read operations, or erase operations. Host system 120 or memory sub-system controller 115 can send requests and/or commands to memory device 130, such as to store data on a memory device 130 or to read data from memory device 130. In one embodiment, the requests are directed to data in different zones of the zone namespace, where the zones are associated with different planes of memory device 130.

At operation 430, the processing logic concurrently performs a first memory access operation on first data stored in the first zone, such as zone 306, of the multiple zones, where zone 306 is associated with a first plane, such as plane 300, and a second memory access operation on second data stored in the second zone, such as zone 336, of the multiple zones, where zone 336 is associated with a second plane, such as plane 330. In one embodiment, the first memory access operation is a program operation on the first data stored in zone 306, and the second memory access operation is a read operation on the second data stored in zone 336. In one embodiment, plane access control component 113 can perform the first memory access operation and the second memory access operation concurrently (i.e., at least partially overlapping in time), such that at least a portion of the first memory access operation is still being performed at a time when the second memory access operation is initiated. In this manner, plane access control component can perform the read operation on the second data without suspending the program operation on the first data. In order to concurrently perform the first memory access operation and the second memory access operation, plane access control component 113 can concurrently configure, for the multiple memory access operations, a first driver circuit, such as driver 274(0) corresponding to the first plane and a second driver circuit, such as driver 274(3) corresponding to the second plane. Each driver circuit can concurrently provide signals to access blocks of a corresponding plane during the memory access operations.

Figure 5:
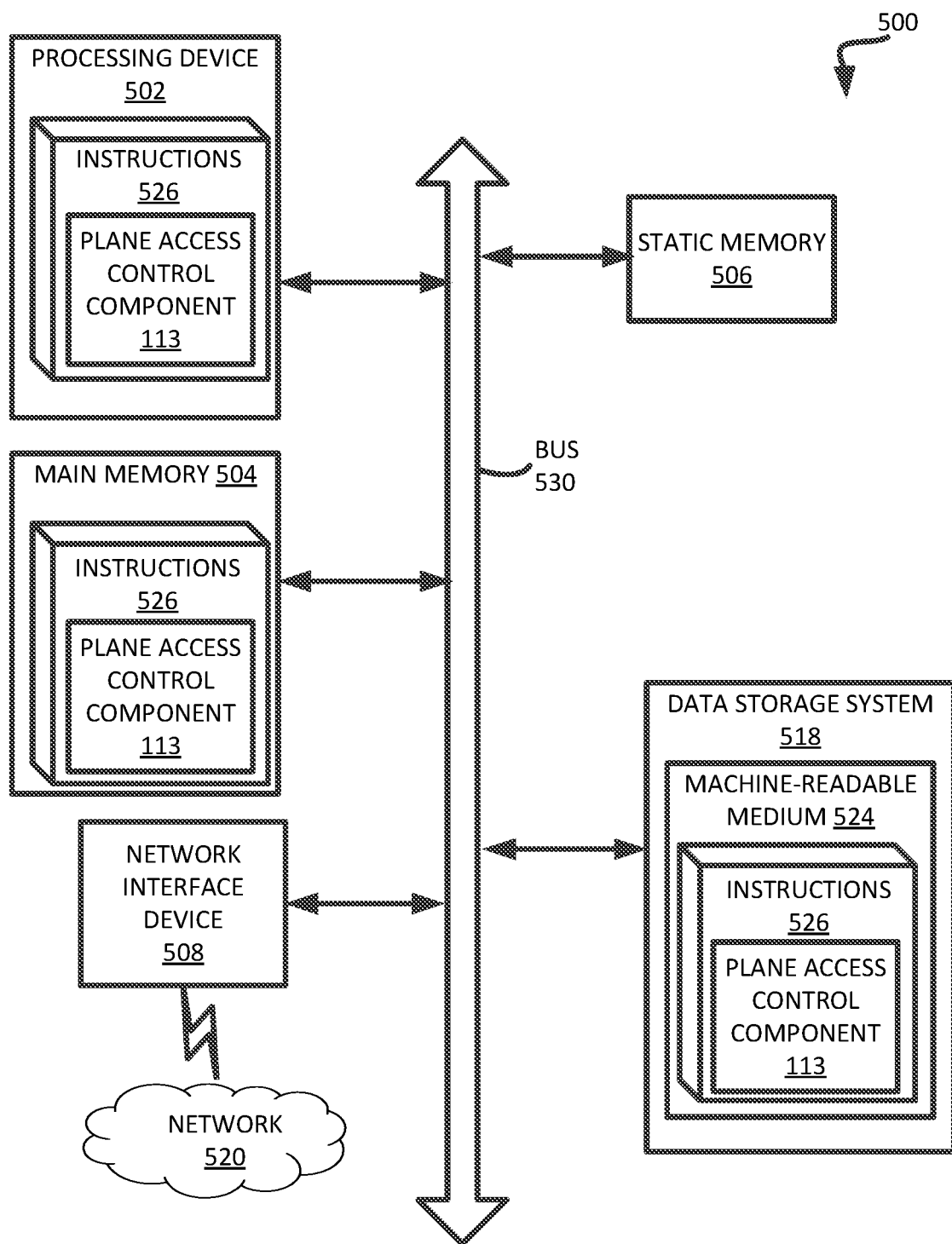
FIG. 5 is a block diagram of an example computer system in which embodiments of the present disclosure can operate.

FIG. 5 illustrates an example machine of a computer system 500 within which a set of instructions, for causing the machine to perform any one or more of the methodologies discussed herein, can be executed. In some embodiments, the computer system 500 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to plane access control component 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 500 includes a processing device 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a data storage system 518, which communicate with each other via a bus 530.

Processing device 502 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 502 can also be one or more special-purpose processing devices such as an application specific integrated circuit (ASIC), a field programmable gate array (FPGA), a digital signal processor (DSP), network processor, or the like. The processing device 502 is configured to execute instructions 526 for performing the operations and steps discussed herein. The computer system 500 can further include a network interface device 508 to communicate over the network 520.

The data storage system 518 can include a machine-readable storage medium 524 (also known as a computer-readable medium) on which is stored one or more sets of instructions 526 or software embodying any one or more of the methodologies or functions described herein. The instructions 526 can also reside, completely or at least partially, within the main memory 504 and/or within the processing device 502 during execution thereof by the computer system 500, the main memory 504 and the processing device 502 also constituting machine-readable storage media. The machine-readable storage medium 524, data storage system 518, and/or main memory 504 can correspond to the memory sub-system 110 of FIG. 1.

In one embodiment, the instructions 526 include instructions to implement functionality corresponding to plane access control component 113 of FIG. 1). While the machine-readable storage medium 524 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A system comprising:
a memory device comprising a plurality of planes; and
a processing device, operatively coupled with the memory device, to perform operations comprising:
configuring the memory device with a zone namespace having a plurality of zones;
associating a first zone of the plurality of zones with a first plane of the plurality of planes; and
associating a second zone of the plurality of zones with a second plane of the plurality of planes.

2. The system of claim 1, wherein each plane of the plurality of planes has an associated driver circuit configured to concurrently provide signals to access blocks of a corresponding plane during memory access operations.

3. The system of claim 1, wherein each zone of the plurality of zones in the zone namespace accepts sequential write operations from a host system, wherein the first zone is associated with a first client of the host system, and wherein the second zone is associated with a second client of the host system.

4. The system of claim 1, wherein associating the first zone with the first plane comprises storing blocks of data corresponding to the first zone on the first plane, and wherein associating the second zone with the second plane comprises storing blocks of data corresponding to the second zone on the second plane.

5. The system of claim 1, wherein the processing device to perform further operations comprising:
associating a third zone of the plurality of zones with the second plane of the plurality of planes, wherein one or more blocks of data corresponding to the third zone are stored entirely on the second plane.

6. The system of claim 1, wherein the processing device to perform further operations comprising:
performing a first memory access operation on first data stored in the first zone; and
performing a second memory access operation on second data stored in the second zone, wherein the first memory access operation and the second memory access operation at least partially overlap in time.

7. A method comprising:
receiving requests to perform a plurality of memory access operations at a memory device configured with a zone namespace having a plurality of zones, the memory device comprising a plurality of planes, wherein each zone of the plurality of zones is associated with a separate plane of the plurality of planes; and concurrently performing a first memory access operation of the plurality of memory access operations on first data stored in a first zone of the plurality of zones and a second memory access operation of the plurality of memory access operations on second data stored in a second zone of the plurality of zones, wherein the first zone is associated with a first plane of the plurality of planes, and wherein the second zone is associated with a second plane of the plurality of planes.

8. The method of claim 7, wherein the first memory access operation comprises a program operation on the first data stored in the first zone, and wherein the second memory access operation comprises a read operation on the second data stored in the second zone.

9. The method of claim 8, wherein concurrently performing the first memory access operation and the second memory access operation comprises performing the read operation on the second data without suspending the program operation on the first data.

10. The method of claim 7, wherein the first zone comprises one or more blocks stored on the first plane of the plurality of planes, and wherein the second zone comprises one or more blocks stored on the second plane of the plurality of planes.

11. The method of claim 7, wherein each zone of the plurality of zones in the zone namespace accepts sequential write operations from a host system.

12. The method of claim 11, wherein the first zone is associated with a first client of the host system, and wherein the second zone is associated with a second client of the host system.

13. The method of claim 7, wherein concurrently performing the first memory access operation and the second memory access operation comprises concurrently configuring, for the plurality of memory access operations, a first driver circuit corresponding to the first plane of the plurality of planes and a second driver circuit corresponding to the second plane of the plurality of planes.

14. A non-transitory computer-readable storage medium comprising instructions that, when executed by a processing device, cause the processing device to perform operations comprising:
receiving requests to perform a plurality of memory access operations at a memory device configured with a zone namespace having a plurality of zones, the memory device comprising a plurality of planes, wherein each zone of the plurality of zones is associated with a separate plane of the plurality of planes; and
concurrently performing a first memory access operation of the plurality of memory access operations on first data stored in a first zone of the plurality of zones and a second memory access operation of the plurality of memory access operations on second data stored in a second zone of the plurality of zones, wherein the first zone is associated with a first plane of the plurality of planes, and wherein the second zone is associated with a second plane of the plurality of planes.

15. The non-transitory computer-readable storage medium of claim 14, wherein the first memory access operation comprises a program operation on the first data stored in the first zone, and wherein the second memory access operation comprises a read operation on the second data stored in the second zone.

16. The non-transitory computer-readable storage medium of claim 15, wherein concurrently performing the first memory access operation and the second memory access operation comprises performing the read operation on the second data without suspending the program operation on the first data.

17. The non-transitory computer-readable storage medium of claim 14, wherein the first zone comprises one or more blocks stored on the first plane of the plurality of planes, and wherein the second zone comprises one or more blocks stored on the second plane of the plurality of planes.

18. The non-transitory computer-readable storage medium of claim 14, wherein each zone of the plurality of zones in the zone namespace accepts sequential write operations from a host system.

19. The non-transitory computer-readable storage medium of claim 18, wherein the first zone is associated with a first client of the host system, and wherein the second zone is associated with a second client of the host system.

20. The non-transitory computer-readable storage medium of claim 14, wherein concurrently performing the first memory access operation and the second memory access operation comprises concurrently configuring, for the plurality of memory access operations, a first driver circuit corresponding to the first plane of the plurality of planes and a second driver circuit corresponding to the second plane of the plurality of planes.

* * * * *